United States Patent [19]

Kaga et al.

[11] Patent Number: 5,159,643
[45] Date of Patent: Oct. 27, 1992

[54] METHOD AND APPARATUS FOR MEASURING PATTERN DIMENSION

[75] Inventors: Yasuhiro Kaga, Yokohama; Fumio Komatsu, Fuchu, both of Japan

[73] Assignee: Kabushiki Kaisha Toshiba, Kawasaki, Japan

[21] Appl. No.: 651,795

[22] Filed: Feb. 7, 1991

[30] Foreign Application Priority Data

Feb. 7, 1990 [JP] Japan ................................. 2-28013

[51] Int. Cl.$^5$ ..................... G06K 9/00; G01B 11/28
[52] U.S. Cl. ...................................... 382/8; 356/379; 364/564
[58] Field of Search ............... 382/8; 364/564; 356/379, 380

[56] References Cited

U.S. PATENT DOCUMENTS 4,326,252  4/1982  Kohno et al. ..................... 364/414
4,406,545  9/1983  Montone et al. ................... 356/380
4,767,212  8/1988  Kitahashi et al. .................. 356/379

Primary Examiner—Leo H. Boudreau
Assistant Examiner—Christopher Kelley
Attorney, Agent, or Firm—Foley & Lardner

[57] ABSTRACT

A pattern dimension measuring method for measuring the dimension of a measuring portion of a pattern of a specimen placed on a specimen stage by controlling a deflector of a scan type electron microscope capable of setting a desired inclination angle of the specimen stage a lens barrel, applying an electron beam to the measuring portion of the specimen, and image processing a secondary electron signal from the measuring portion, the method comprising: a first step of calculating the distance between top edges of the measuring portion of the pattern by image processing the secondary electron signal when the electron beam is applied to the measuring portion at an inclination angle of zero; a second step of obtaining the number of pixels at a taper portion of the measuring portion of the pattern by image processing the secondary electron signal when the electron beam is applied to the measuring portion at a first predetermined inclination angle which allows to observe the bottom edges; a third step of obtaining the number of pixels at the taper portion by image processing the secondary electron signal when the electron beam is applied to the measuring portion at a second predetermined inclination angle different from the first inclination angle which allows to observe the bottom edges; a fourth step of calculating the taper angle and height of the pattern in accordance with the numbers of pixels of the taper portion obtained at the second and third steps and the first and second predetermined inclination angles; and a fifth step of calculating the distance between the bottom edges of the pattern and the difference ratio between the top edge and bottom edge distances in accordance with the results calculated at the fourth step.

5 Claims, 4 Drawing Sheets

METHOD AND APPARATUS FOR MEASURING PATTERN DIMENSION

BACKGROUND OF THE INVENTION

The present invention relates to a method of, and an apparatus for, measuring a pattern dimension using an electron beam, which is particularly suitable for the measurement of a distance between bottom edges of a fine pattern of a reversed taper shape.

In a conventional technique for measuring a pattern dimension using a secondary electron signal generated upon application of an electron beam to a pattern to be measured, various automatic measuring algorithms have been proposed for a pattern of a normal taper shape, such as a linear approximation method, a curve approximation method, a threshold method, a maximum inclination method, a difference method and the like. Such algorithms are selectively used, depending upon the material and shape of a pattern and the material of an underlying layer.

For a pattern of a reversed taper shape such as a line pattern having a larger top dimension than a bottom dimension or a space pattern having a smaller top dimension than a bottom dimension, the distance between the bottom edges has been determined from the distance between top edges or from the cross section obtained by cutting a specimen, because the bottom edges cannot be observed when a beam is applied vertically.

An automatic measuring algorithm, as conventionally used, can detect with high precision the distance between bottom edges of a normal taper shape pattern. However, for a reversed taper shape pattern, the distance between bottom edges cannot be measured if a beam is applied vertically. Manual measurement also allows measurement of only the distance between top edges. A reversed taper shape pattern is found, for example, in a negative type electron beam sensitive resist pattern, an Al-Si wiring pattern and the like. In the case of an Al-Si wiring pattern of a reversed taper shape, as the distance between adjacent patterns becomes short, the probability of generation of a "blowhole" increases during a manufacturing process for an interlayer insulator film. It is therefore necessary to quantitatively check the degree of reversed taper. It is, therefore, required to obtain not only the distance between top edges of a reversed taper shape pattern, but also the distance between bottom edges and a difference ratio (dimension reduction ratio) between the top edge and bottom edge distances.

It is possible to measure the degree of reversed taper by cutting a specimen and observing its cross section. However, it is necessary to break the specimen. In addition, it is difficult to quantitatively observe the cut section of a pattern if it is not exactly vertically cut relative to the pattern.

SUMMARY OF THE INVENTION

It is an object of the present invention to provide a method of and an apparatus for measuring a pattern dimension capable of measuring the dimension and a cross sectional area of a pattern of a reversed taper shape without breaking a specimen.

According to one aspect of the present invention, there is provided a pattern dimension measuring method for measuring the dimension of a measuring portion of a pattern of a specimen placed on a specimen stage by controlling a deflector of a scan type electron microscope capable of setting a desired inclination angle of one of the specimen stage and a lens barrel, applying an electron beam to the measuring portion of the specimen, and image processing a secondary electron signal from the measuring portion, said method comprising: a first step of calculating the distance between top edges of said measuring portion of said pattern by image processing said secondary electron signal when said electron beam is applied to said measuring portion at an inclination angle of zero; a second step of obtaining the number of pixels at a taper portion of said measuring portion of said pattern by image processing said secondary electron signal when said electron beam is applied to said measuring portion at a first predetermined inclination angle which allows one to observe the bottom edges; a third step of obtaining the number of pixels at said taper portion by image processing said secondary electron signal when said electron beam is applied to said measuring portion at a second predetermined inclination angle different from said first inclination angle which allows one to observe the bottom edges; a fourth step of calculating the taper angle and height of said pattern in accordance with the numbers of pixels of the taper portion obtained at said second and third steps and the first and second predetermined inclination angles; and a fifth step of calculating the distance between the bottom edges of said pattern and the difference ratio between the top edge and bottom edge distances in accordance with the results calculated at said fourth step.

According to the pattern dimension measuring method of the first invention, the distance between top edges of a pattern to be measured is calculated by a first step, and the number of pixels of a taper portion of the pattern is obtained for first and second predetermined inclination angles at second and third steps, respectively. In accordance with the numbers of pixels of the taper portion of the pattern obtained at the second and third steps and the first and second predetermined inclination angles, the taper angle and height of the pattern are calculated at a fourth step.

In accordance with the calculated results at the fourth step, the distance between bottom edges of the pattern to be measured and the difference ratio between the top edge and bottom edge distances are calculated at a fifth step.

In accordance with a change in strength of a secondary electron signal from the taper portion, the profile of the taper portion is obtained at a sixth step. In accordance with the distance between bottom edges and the taper portion profile obtained at the fifth and sixth steps, the cross sectional area of the pattern to be measured is calculated at a seventh step. In the above manner, without breaking a specimen, it is possible to correctly measure the dimension and cross sectional area of a fine pattern of a reversed taper shape.

According to another aspect of the present invention, there is provided a pattern dimension measuring apparatus comprising: a scanning electron microscope capable of setting a desired inclination angle by moving at least one of a specimen stage placing a specimen and an electron optical column; image processing means for processing a secondary electron signal generated from the measuring portion of the specimen placed on said specimen stage upon application of an electron beam to said measuring portion; first calculation means for calculating the distance between top edges in said measuring portion of said pattern in accordance with an output from said image processing means when said electron beam is applied to said measuring portion at an inclination angle of zero; second calculation means for calculating the taper angle, height of said pattern, distance between the bottom edges of said pattern, the difference ratio between the top edge and bottom edge distances, and the profile of a taper portion in accordance with an output from said image processing means when said electron beam is applied to said measuring portion at a first predetermined inclination angle and a second predetermined inclination angle; and third calculation means for calculating the surface area of said pattern in accordance with the outputs from second calculation means.

According to the pattern dimension measuring apparatus of the second invention, a first calculation means calculates the distance between top edges of a pattern to be measured, in accordance with an output from an image processing means when an electron beam is applied at a zero inclination angle.

A second calculation means calculates the taper angle, height, bottom edge distance of the pattern and the difference ratio between the top edge and bottom edge distances in accordance with an output from the image processing means when an electron beam is applied at first and second predetermined inclination angles. In accordance with an output from the second calculation means, a third calculation means calculates the cross sectional area of the pattern. In the above manner, without breaking a specimen, the dimensions and cross sectional area of a fine pattern of a reversed taper shape can be correctly measured.

As described above, according to the present invention, the dimensions and cross sectional area of a fine pattern of a reversed taper shape can be correctly measured without breaking a specimen.

DESCRIPTION OF THE PREFERRED EMBODIMENTS

Figure 1:
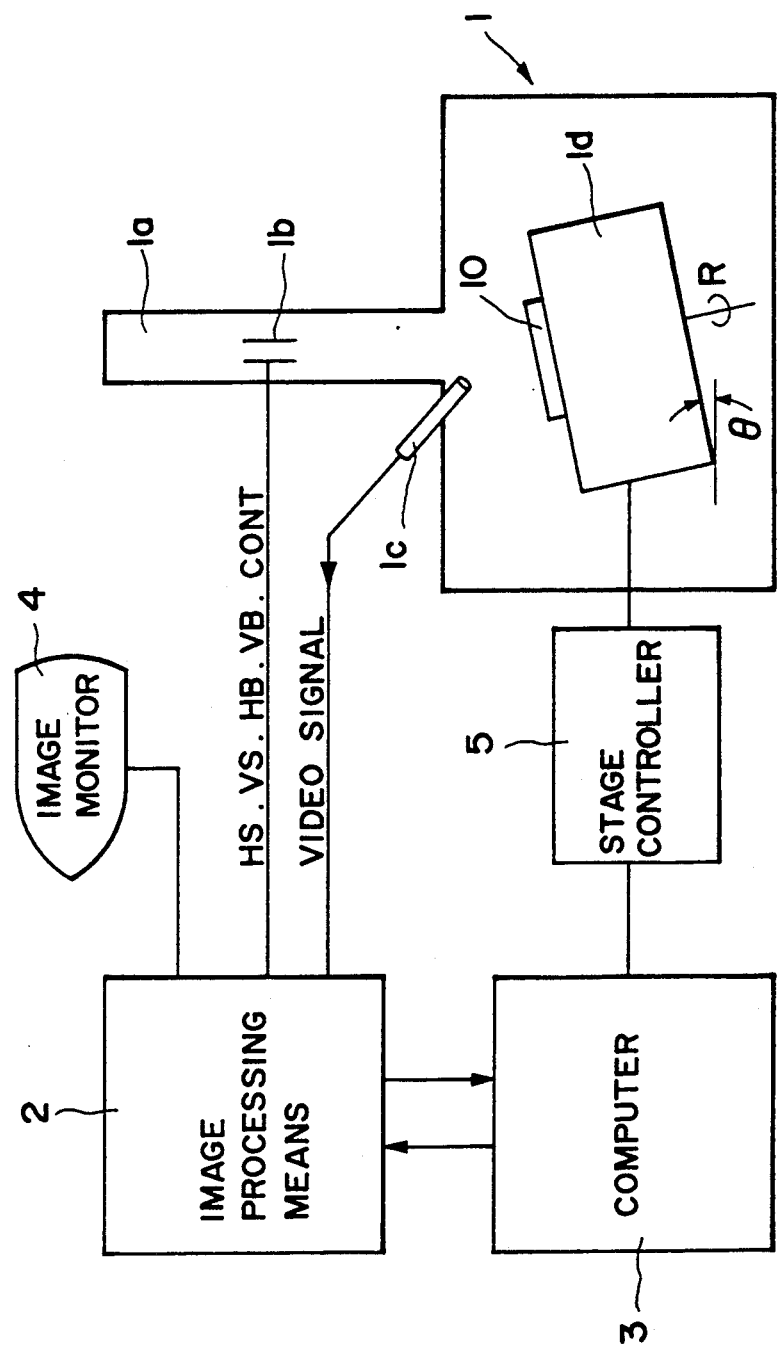
FIG. 1 is a block diagram showing the structure of a pattern dimension measuring apparatus according to an embodiment of this invention.

FIG. 1 shows the structure of a pattern dimension measuring apparatus according to an embodiment of this invention. The pattern dimension measuring apparatus of this embodiment is constructed of a scanning electron microscope 1 (hereinafter called an SEM) including an electron optical column 1a, deflector 1b, detector 1c, and stage 1d for holding a specimen 10, an image processing means 2 for receiving a video signal from the detector 1c and performing various image processing, a type of computer 3 for controlling the image processing means and the stage and for performing calculations for the measurement of dimensions and shapes, an image monitor 4, and a stage controller 5.

Figure 7:
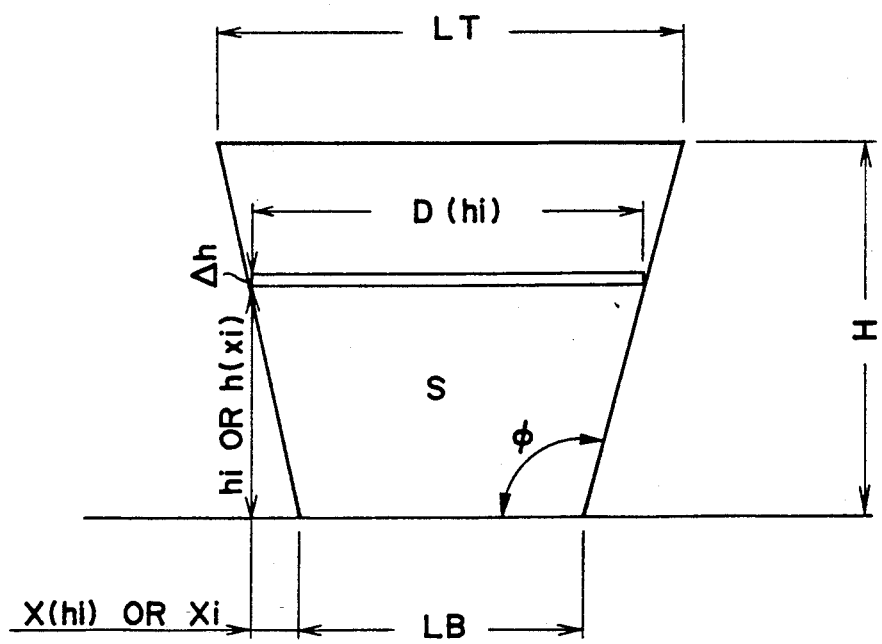
FIG. 7 shows a cross section of a pattern of a reversed taper shape.

The structure and operation of this embodiment will be described with reference to FIGS. 2 to 5 by taking as an example the case where a pattern of a reversed taper shape shown in FIG. 7 is measured. The pattern shown in FIG. 7 assumes that the right and left of the cross section thereof are symmetrical relative to the central axis.

Figure 2:
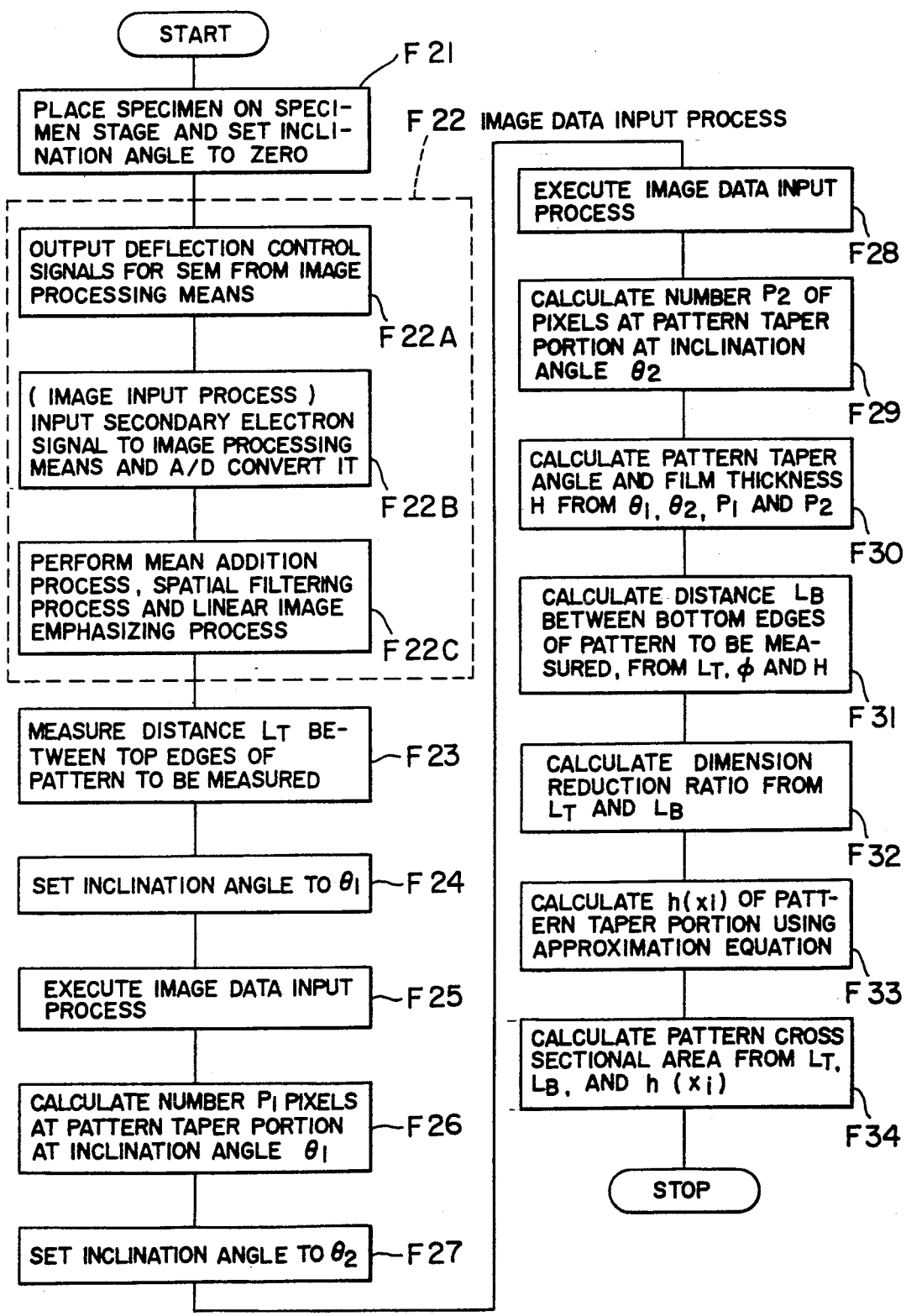
FIG. 2 is a flowchart explaining the operation of the embodiment.
Figure 3:
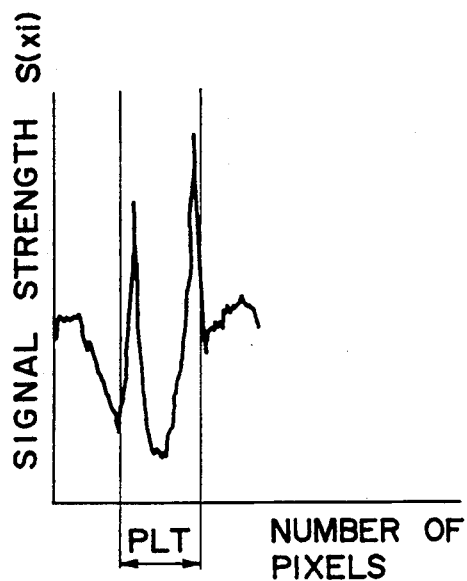
FIGS. 3 to 5 are graphs showing signal waveforms obtained by the image processing means of this invention.
Figure 4:
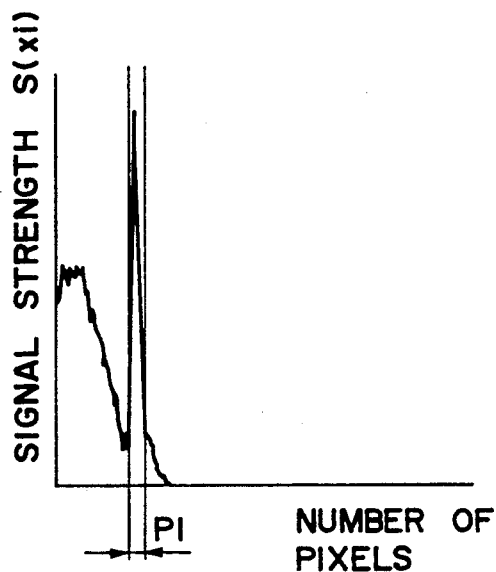
Figure 5:
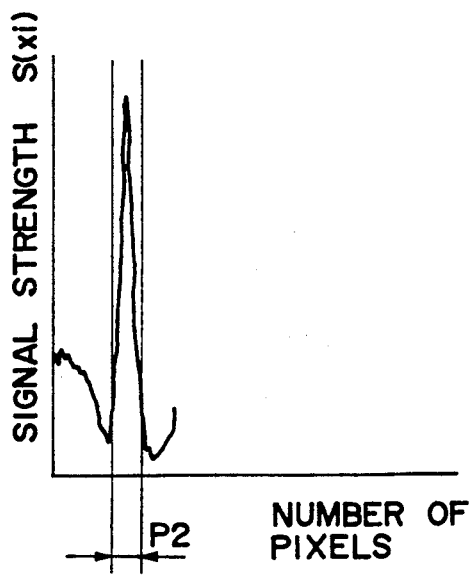

First, a specimen 10 is placed on the stage 1d and the inclination angle $\theta$ of the stage 1d is set to zero (perpendicular to the incident beam direction) by using the stage controller 5 (at step F21 of FIG. 2). After the measurement magnification M is set, the image processing means 2 sends deflection control signals for SEM 1 to the deflector 1b to thereby scan the electron beam, the deflection control signals including an Horizontal Scan (HS) signal, Vertical Scan (VS) signal, Horizontal Blank (HB) signal, Vertical Blank (VB) signal, and Control (CONT) signal (step F22A). The scanning electron beam impinges on the specimen 10 placed on the stage 1d so that secondary electrons are emitted from the specimen 10 which are then detected by the detector 1c. A detection output (secondary electron signal) from the detector 1c is sent to the image processing means 2, whereat it is sampled at a predetermined sampling timing and A/D converted (step F22B), and thereafter subjected to a mean addition process, a spatial filtering process and a linear image emphasizing process, the processed results being stored in a frame memory of the image processing means 2 having 256 tonal steps, and the signal waveforms being displayed on the image monitor 4 (step F22C). The processes from the step F22A to F22C are collectively called an image data input process hereinafter where applicable. In accordance with the signal waveforms thus obtained and shown in FIG. 3, there is obtained the number $P_{LT}$ of pixels at the top portion of the pattern, and the top portion distance $L_T$ is calculated by the computer 3 (step F23).

Next, by using the stage controller 5, the inclination angle $\theta$ of the stage 1d of SEM 1 is set to a predetermined inclination angle $\theta_1$ to allow observing the bottom edges (step F24), and thereafter, the above-described image input process is executed (step F25). In accordance with the obtained signal waveforms shown in FIG. 4, the number $P_1$ of pixels corresponding to the taper portion width of the pattern is obtained (step F26) Thereafter, by using the stage controller 5, the inclination angle $\theta$ of the stage 1d is set to a predetermined inclination angle $\theta_2$ (different from $\theta_1$) to allow the observing of the bottom edges (step F27), and thereafter the similar image input process is executed (step F28). In accordance with the obtained signal waveforms shown in FIG. 5, the number $P_2$ of pixels corresponding to the same taper portion width is obtained (step F29). In accordance with the obtained pixel numbers $P_1$ and $P_2$, the taper angle $\phi$, and height H (film thickness) are calculated by the computer 3 using the following equations (1) and (2) derived from the stereoscopic principle (step F30):

$$\phi = \tan^{-1}\left(\frac{P_1 \cdot \cos\theta_2 - P_2 \cdot \cos\theta_1}{P_1 \cdot \sin\theta_2 - P_2 \cdot \sin\theta_1}\right) \quad (1)$$

$$H = C \cdot \frac{P_1}{M} \cdot \frac{\sin\phi}{\cos(\phi + \theta_1)} \quad (2)$$

where M represents a measurement magnification, and C represents a length on the image monitor 4 of one pixel at the measurement magnification M.

In accordance with the calculated taper angle $\phi$, height H, and top portion distance $L_T$, the bottom portion distance $L_B$ of the pattern is calculated by the computer 3 using the following equation (3) (step F31):

$$L_B = L_T - 2 \cdot H \cdot \tan(\phi - 90) \quad (3)$$

Similarly, the difference ratio F between the top edge and bottom edge distances is calculated by the following equation (4) (step F33):

$$F = \frac{L_B - L_T}{L_B} \quad (4)$$

If the taper portion can be approximated by a straight line, the cross sectional area S of the pattern of the reversed taper shape is calculated by the computer using the following equation (5):

$$S = \frac{(L_T + L_B)}{L_B} \cdot H \quad (5)$$

If the taper portion cannot be approximated by a straight line, first the height h $(x_i)$ of the taper portion at the distance $x_i$ from the bottom edge is approximated using the corresponding secondary electron signal S $(x_i)$ from the following equation (6) (step F33):

$$h(x_i) = \sum_{k=1}^{i-1} (h(x_k) - h(x_{k-1})) + \frac{S(x_i)}{\sum_{i=1}^{n} S(x_k)} \cdot H \quad (6)$$

where n represents the number of pixels corresponding to the taper portion width. From the relation between $x_i$ and $h(x_i)$, the distance X $(h_i)$ from the bottom edge at the height $h_i$ can be obtained. Using X $(h_i)$, the width D $(h_i)$ of the pattern at the height $h_i$ is calculated using the following equation (7):

$$D(h_i) = L_B + 2 \cdot X(h_i) \quad (7)$$

The cross sectional area S of the pattern is therefore calculated using the following equation (8) (step F34):

$$Si = \sum_{i=1}^{n} (D(h_i) - \Delta h \quad (8)$$

where $\Delta h$ represents the increment of height per one pixel at the height $h_i$.

Figure 6:
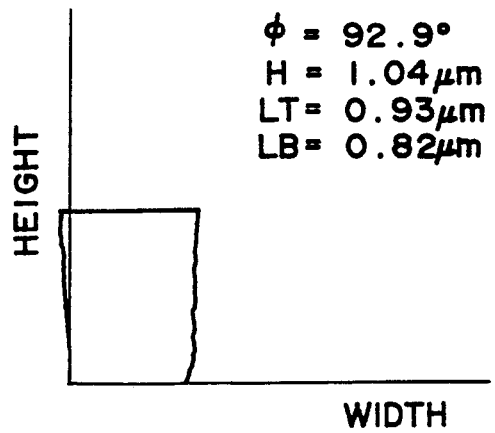
FIG. 6 is a graph showing a cross section of a pattern measured with the pattern dimension measuring apparatus shown in FIG. 1.

The measurement results of a pattern of a reversed taper shape obtained using the pattern dimension measuring apparatus of this embodiment are shown in FIG. 6. The measurement results indicate that the taper angle $\phi = 92.9$ degrees, height $H = 1.04$ $\mu$m, top distance $L_T = 0.93$ $\mu$m, and bottom distance $L_B = 0.82$ $\mu$m. The measurement results of the pattern dimension obtained from the cross section photograph of the cut pattern indicated that the taper angle $\phi = 93$ degrees, height $H = 1.03$ $\mu$m, top distance $L_T = 0.94$ $\mu$m, and bottom distance $L_B = 0.83$ $\mu$m.

It is thus possible to correctly measure the dimension and cross sectional area of a pattern of a reversed taper shape by using the pattern dimension measuring apparatus of this embodiment.

In the above embodiment, the description is made assuming that taper angles in right and left sides of the pattern cross section are the same. However, in general, taper angles in both sides are different. For such a pattern, the measurement is performed as follows:

For the case where the rotating stage is not used, after determining the taper shape at one side using the first and second predetermined angle, the stage is inclined in the opposite angular direction to obtain the third and fourth predetermined inclination angles $\theta_3$ and $\theta_4$. Of course, these angles are selected under the condition that they allow observing the bottom edges. The tape shape (height, taper angle, profile and so on) at the other side is calculated using the angles $\theta_3$ and $\theta_4$, and the number of pixels P3 and P4 obtained by the same method as described above. Then the bottom dimension is calculated, using the taper shapes at both sides and the top dimension.

For the case where the rotating stage is used, the stage is rotated after obtaining P1 at the first predetermined inclination angle $\theta_1$. If the bottom edge can be observed after rotating the stage for 180 degrees, there is no need to change the inclination angle of the stage, and third predetermined inclination angle $\theta_3$ at this time is the same as the first predetermined inclination angle $\theta_1$. Similarly, the fourth predetermined inclination angle $\theta_4$ can be selected same as the second predetermined inclination angle $\theta_2$ by rotating the stage.

What is claimed is:

1. A pattern dimension measuring method for measuring a dimension of a measuring portion of a pattern of a specimen placed on a specimen stage by controlling a deflector of a scan type electron microscope capable of setting a desired inclination angle of one of the specimen stage and a lens barrel, applying an electron beam to the measuring portion of the specimen, and image processing a secondary electron signal from the measuring portion, said method comprising:

a first step of calculating the distance between top edges of said measuring portion of said pattern by image processing said secondary electron signal when said electron beam is applied to said measuring portion at an inclination angle of zero;

a second step of obtaining a number of pixels corresponding to a taper portion width of said measuring portion of said pattern by image processing said secondary electron signal when said electron beam is applied to said measuring portion at a first predetermined inclination angle which allows the bottom edges to be observed;

a third step of obtaining a number of pixels at said taper portion by image processing said secondary electron signal when said electron beam is applied to said measuring portion at a second predetermined inclination angle different from said first inclination angle which allows the bottom edges to be observed;

a fourth step of calculating the taper angle and height of said pattern in accordance with the number of pixels of the taper portion obtaining at said second and third steps and the first and second predetermined inclination angles; and a fifth step of calculating the distance between the bottom edges of said pattern and a difference ratio between the top edge and bottom edge distances in accordance with the results calculated in said fourth step.

2. A method according to claim 1, wherein if said taper portion of said pattern cannot be approximated by a straight line, the profile of said taper portion is obtained in a sixth step in accordance with a change in the strength of said secondary electron signal from said taper portion.

3. A method according to claim 1, wherein if the taper angles at the right and left side of said pattern are different, after a taper shape measurement at one side using the first predetermined inclination angle and the second predetermined inclination angle, a taper shape measurement at the other side is performed using a third predetermined inclination angle and a fourth inclination angle which are obtained by rotation of a rotating stage or change of stage angle in opposite angle direction.

4. A method according to claim 2, further comprising a seventh step of calculating the cross sectional area of said measuring portion of said pattern in accordance with the bottom edge distance and said taper portion profile obtained at said fifth and sixth steps, respectively.

5. A pattern dimension measuring apparatus comprising:

a scanning electron microscope capable of setting a desired inclination angle by moving at least one of a specimen stage placing a specimen and an electron optical column;

image processing means for processing a secondary electron signal generated from the measuring portion of the specimen placed on said specimen stage upon application of an electron beam to said measuring portion;

first calculation means for calculating the distance between top edges in said measuring portion of said pattern in accordance with an output from said image processing means when said electron beam is applied to said measuring portion at an inclination angle of zero;

second calculation means for calculating the taper angle, height of said pattern, distance between the bottom edges of said pattern, a difference ratio between the top edge and bottom edge distances, and the profile of the taper portion in accordance with an output from said image processing means when said electron beam is applied to said measuring portion at a first predetermined inclination angle and a second predetermined inclination angle; and third calculation means for calculating the cross-section area of said pattern in accordance with the outputs from second calculation means.

* * * * *